United States Patent [19]

Howell

[11] 4,150,411
[45] Apr. 17, 1979

[54] GROUND FAULT CIRCUIT INTERRUPTER UTILIZING A SINGLE TRANSFORMER

[75] Inventor: Edward K. Howell, Simsbury, Conn.

[73] Assignee: General Electric Company, New York, N.Y.

[21] Appl. No.: 860,917

[22] Filed: Dec. 15, 1977

[51] Int. Cl.² ............................................. H02H 3/28
[52] U.S. Cl. ..................................... 361/45; 361/113
[58] Field of Search .................... 361/45, 44, 46, 78, 361/86, 87, 113

[56] References Cited

U.S. PATENT DOCUMENTS

| | | | |
|---|---|---|---|
| 3,786,356 | 1/1974 | MacPhee | 361/45 |
| 3,794,884 | 2/1974 | Sircom | 361/45 |
| 3,801,871 | 4/1974 | Loh | 361/45 |
| 3,879,639 | 4/1975 | Sircom | 361/45 |
| 3,963,959 | 6/1976 | Howell | 361/45 |
| 4,001,646 | 1/1977 | Howell | 361/45 |
| 4,012,668 | 3/1977 | Wittlinger | 361/44 |

Primary Examiner—Patrick R. Salce
Attorney, Agent, or Firm—Robert A. Cahill; Walter C. Bernkopf; Philip L. Schlamp

[57] ABSTRACT

A single transformer is alternately operated as a differential current transformer with its secondary winding connected as the input to a low impedance differential amplifier with large negative feedback during a ground fault current sampling period and then as a coupled resonant circuit operating into a negative resistance network during a neutral-to-ground resistance sampling period. During the fault current sampling period, the amplifier is gated ON and OFF to switch the transformer secondary loading between essentially short-circuit and open-circuit conditions. The resulting amplifier feedback current pulses, indicative of transformer secondary current, are integrated either directly or indirectly, to develop a DC signal proportional to any ground fault current.

20 Claims, 6 Drawing Figures

GROUND FAULT CIRCUIT INTERRUPTER UTILIZING A SINGLE TRANSFORMER

BACKGROUND OF THE INVENTION

Ground fault circuit interrupting (GFCI) devices have been sanctioned by the National Electric Code for use in residential circuits to protect against the hazards of electrical shock due to ground faults. Such GFCI devices, as presently constructed, utilize a differential current transformer to sense a current imbalance in the line and neutral conductors of a distribution circuit as occasioned by current flowing through a line-ground fault and returning to the source through an unintended ground circuit path other than the neutral conductor. To provide effective electrical shock protection, the differential current transformer must develop a signal of sufficient magnitude to enable a signal processor to initiate circuit interruption when the current imbalance in the line and neutral conductors is 5 milliamps or more. For ease of manufacture and to accommodate a compact design, the line and neutral conductors, which constitute the primary windings of the differential current transformer, preferably each make a single pass through the aperture of the toroidal transformer core. Thus, to satisfy a 5 milliamp trip level, the GFCI signal processor must be designed to respond to a transformer primary excitation of 0.005 ampere-turns. So that the design constraints on the signal processor are not so rigid as to be prohibitively expensive, the differential current transformer must have a high permeability core and a secondary winding of many turns, typically in excess of 1,000 turns of very fine wire, in order to develop a fault signal voltage across a burden resistor of practical magnitudes. Signal levels are nevertheless quite low, one to ten millivolts, requiring high amplification. With such high amplification, the processor design must insure amplifier stability and adequate noise immunity to prevent nuisance tripping of the GFCI device.

In addition to sensing the existence of ground fault current flowing through a high impedance line-ground fault, approved GFCI devices must also respond to the existence of a low impedance ground fault on the neutral conductor adjacent the load. Since the neutral conductor is also grounded at the source in conventional wiring installations, such double grounding of the neutral conductor creates the situation where at least a portion of any ground fault current flowing through a line-ground fault returns to the source via the neutral-ground fault and the neutral conductor. As a consequence, the current differential or imbalance showing up in the differential current transformer would not truly be indicative of the magnitude of the ground leakage current. Consequently, the GFCI device would trip only in response to considerably higher ground fault current levels. It is for this reason that Underwriters Laboratories requires that GFCI devices also have the capability of interrupting the circuit in the event of desensitizing, low impedance ground fault on the neutral conductor.

The conventional approach toward coping with such a desensitizing neutral-ground faults to utilize a second, so-called neutral transformer having a secondary winding connected in series with at least the neutral side of the distribution circuit. If the neutral conductor experiences a low impedance ground fault adjacent the load, it becomes a closed loop secondary winding, and driving of the neutral transformer primary winding will produce a current flow in this secondary loop. If the neutral ground fault impedance is sufficiently low as to have a significant desensitizing effect on the response of the GFCI device to ground fault current, the current induced in the secondary loop is of sufficient magnitude to create the requisite current imbalance in the differential transformer for initiating a trip function.

The addition of this second transformer adds significantly to the cost of current GFCI designs, and it also takes up valuable space which is at a premium when faced with the task of packaging a GFCI module in circuit breakers and convenient outlet receptacles capable of being installed in existing enclosures.

It is accordingly an object of the present invention to provide an improved ground fault circuit interrupting device capable of responding both to high impedance ground faults on the line conductor and low impedance ground faults on the neutral conductor of a conventional electrical power distribution circuit.

An additional object is to provide a ground fault circuit interrupting device of the above character wherein both ground fault sensing functions are accommodated utilizing a single current transformer.

A further object is to provide a ground fault circuit interrupting device of the above character which utilizes an improved signal processor design approach to the handling of ground fault signals appearing in the secondary of the single current transformer.

Still another object of the present invention is to provide a ground fault circuit interrupting device of the above character, wherein the single transformer may be of an inexpensive design in the sense that its toroidal core may have a lower permeability and its secondary winding fewer turns as compared with current transformer designs.

Yet another object of the present invention is to provide a ground fault circuit interrupting device of the above character, which is reliable in operation, not prone to nuisance tripping, and inexpensive to manufacture in quantity.

Other objects of the invention will in part be obvious and in part appear hereinafter.

SUMMARY OF THE INVENTION

In my U.S. Pat. No. 3,963,959, I disclosed a ground fault circuit interrupting (GFCI) device wherein the secondary winding of a differential current transformer is normally shorted on itself through an electronic switch connected in shunt with a large burden resistor. Secondary current occasioned by the existence of a current imbalance in the differential transformer primary windings normally flows through the switch, thereby permitting the use of a burden resistor of a higher resistance than can be used in the situation where secondary current always flows through a burden resistor, as is conventional practice. Periodically, the electronic switch is opened to then force the secondary current through the burden resistor, thereby developing, by virtue of its greater resistance, a momentary, relatively large signal voltage thereacross for application to a signal processor pursuant to initiating a trip function. Utilizing this approach, the differential current transformer core can be of relatively inexpensive, low permeability ferrite material, rather than the expensive, high permeability nickle-iron material currently utilized in GFCI differential current transformers. Additional cost savings may be achieved by utilizing a secondary winding of considerably fewer turns—as much as an order of magnitude fewer turns—than existing GFCI differential current transformers.

In accordance with the present invention, equivalent differential current transformer cost savings are achieved by connecting the differential transformer secondary winding to an active load which can be switched between exceptionally low and exceptionally high impedance states, such that the loading of the differential current transformer secondary is switched between essentially short-circuit and open-circuit conditions. Rather than observing the voltage developed across the secondary winding by switching in a burden resistor, as in the approach of the above-noted patent, the present invention utilizes the approach of observing the current flowing in the secondary winding, as occasioned by a primary current imbalance, during the period the secondary winding is short circuited. During this period, the secondary current is essentially unaffected by core permeability, hence permitting the use of a low permeability core material, such as ferrite.

More specifically, the differential current transformer secondary winding is connected directly to the inputs of a differential current amplifier having large negative feedback. Under these circumstances, the amplifier presents an exceptionally low impedance, virtually a short ciruict, to the secondary winding. The flow of current in the secondary winding produces a corresponding current flow in the amplifier feedback path. To minimize the effects of noise and amplifier off-set voltage which would tend to produce nuisance tripping, it is an important feature of the present invention that the amplifier be repetitively gated ON and OFF, such that the amplifier presents essentially zero impedance loading while it is ON and essentially infinite impedance loading of the secondary winding while it is OFF. The amplifier feedback current then takes the form of a series of current pulses of a polarity determined by whether the rate of change, i.e., slope, of the secondary current waveform is positive or negative. So that the amplifier feedback current pulses are of the same polarity and thus susceptible to integration, a sampling period for the transformer secondary current is selected to coincide with the period in each cycle of the line frequency when the slope of the secondary current waveform is of one polarity, i.e., from the 90° point to the 270° point (peak to peak) of the secondary current wave.

According to one embodiment of the invention, the amplifier is periodically switched ON and OFF to provide a series of uniform duration secondary current sampling intervals within each sampling period. The resulting feedback current pulses, each of an amplitude corresponding to the change in the secondary current during its associated sampling interval, are integrated in a capacitor included in the feedback path. The voltage developed on the integrating capacitor during the sampling period is monitored by a detector and, if an established threshold voltage is exceeded, a ground fault trip function is initiated.

In an alternative embodiment, the amplifier is gated ON and OFF at a varying rate dependent on the rate of change of secondary current to develop during each sampling period uniform current pulses of varying repetition rate of frequency. These current pulses are then integrated pursuant to developing a voltage which is threshold detected in determining whether or not a ground fault trip function should be initiated.

At the conclusion of the secondary current sampling period during which the existence of a line-ground fault is detected, the GFCI signal processor of the present invention automatically converts to a neutral-ground fault sensing mode. To this end, the differential transformer secondary winding is coupled as a resonant circuit operating into a negative resistance network in the manner disclosed in my U.S. Pat. No. 4,001,646, the disclosure of which is specifically incorporated herein by reference. This resonant tank circuit, which includes the reflected resistance of any fault connecting a neutral conductor to ground, is shock excited to produce a ringing oscillation therein. In the absence of a low-impedance, desensitizing ground fault on the neutral conductor, the ringing oscillation is regenerative in that its amplitude increases over the duration of a second, neutral ground fault sampling period. On the other hand, if the neutral conductor is subjected to a desensitizing ground fault, the ringing oscillation in this resonant circuit will be degenerative with its amplitude decreasing over the neutral ground fault sampling period. A level detector, included in the signal processor, functions to inject a charge on the integrating capacitor in the amplifier feedback circuit if the amplitude of the ringing oscillation does not exceed a predetermined threshold level at the end of this sampling period. During the next transformer secondary current sampling period, the charge on the integrating capacitor is threshold detected and if it exceeds the threshold established for line-ground fault current, a ground fault trip function is initiated. Preferably several neutral ground fault sampling periods are required to inject sufficient charge on the integrating capacitor to exceed the threshold level.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
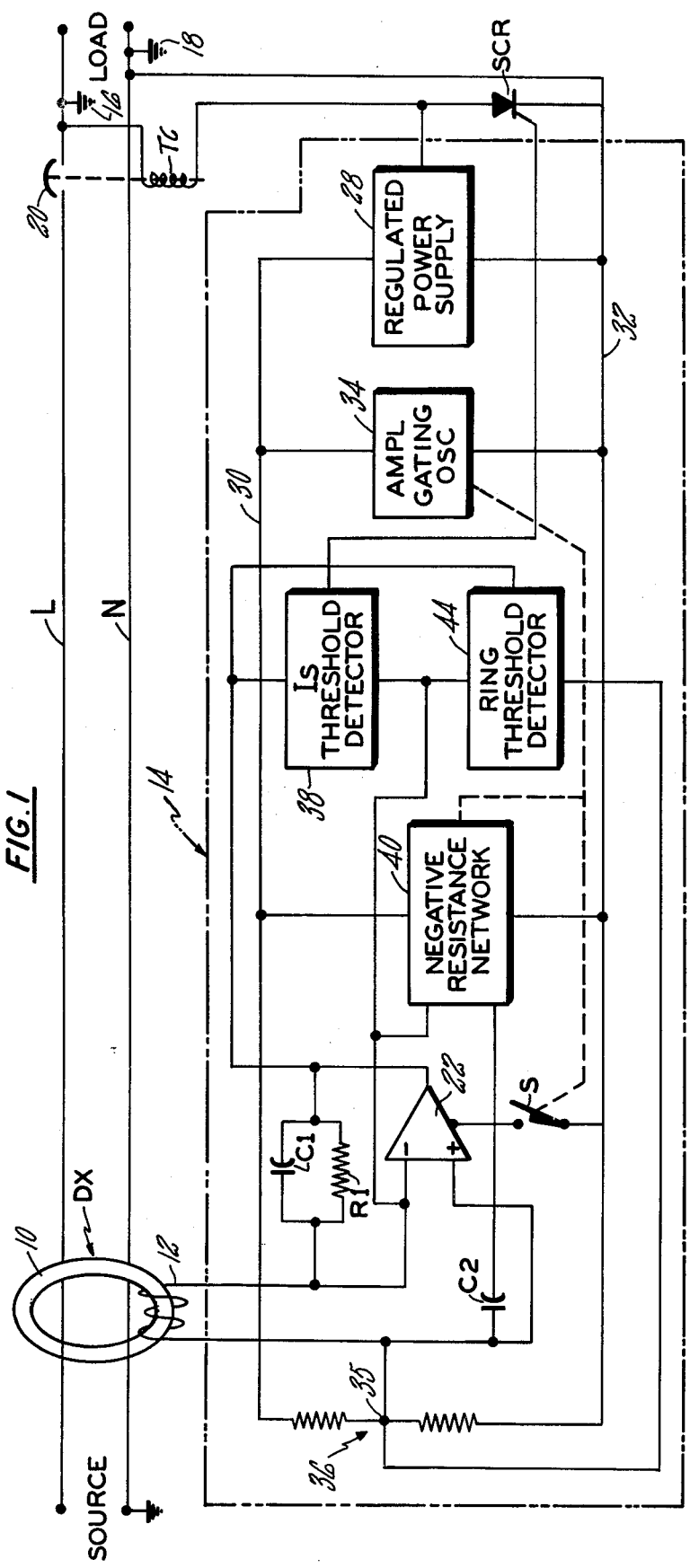
FIG. 1 is a generalized schematic diagram, partially in block form, of a ground fault circuit interrupting (GFCI) device embodying the present invention.
Figure 3A:
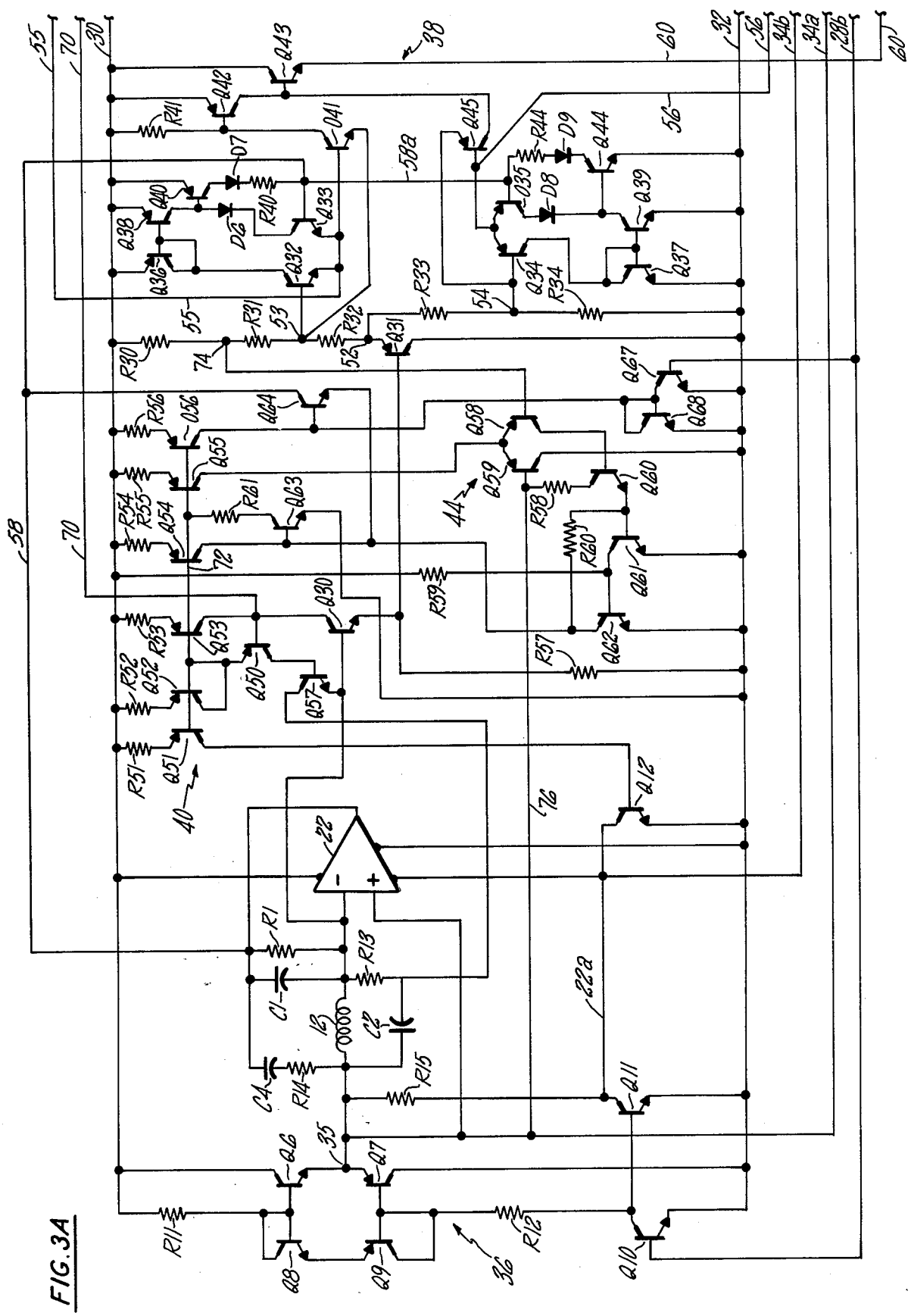
Figure 3B:
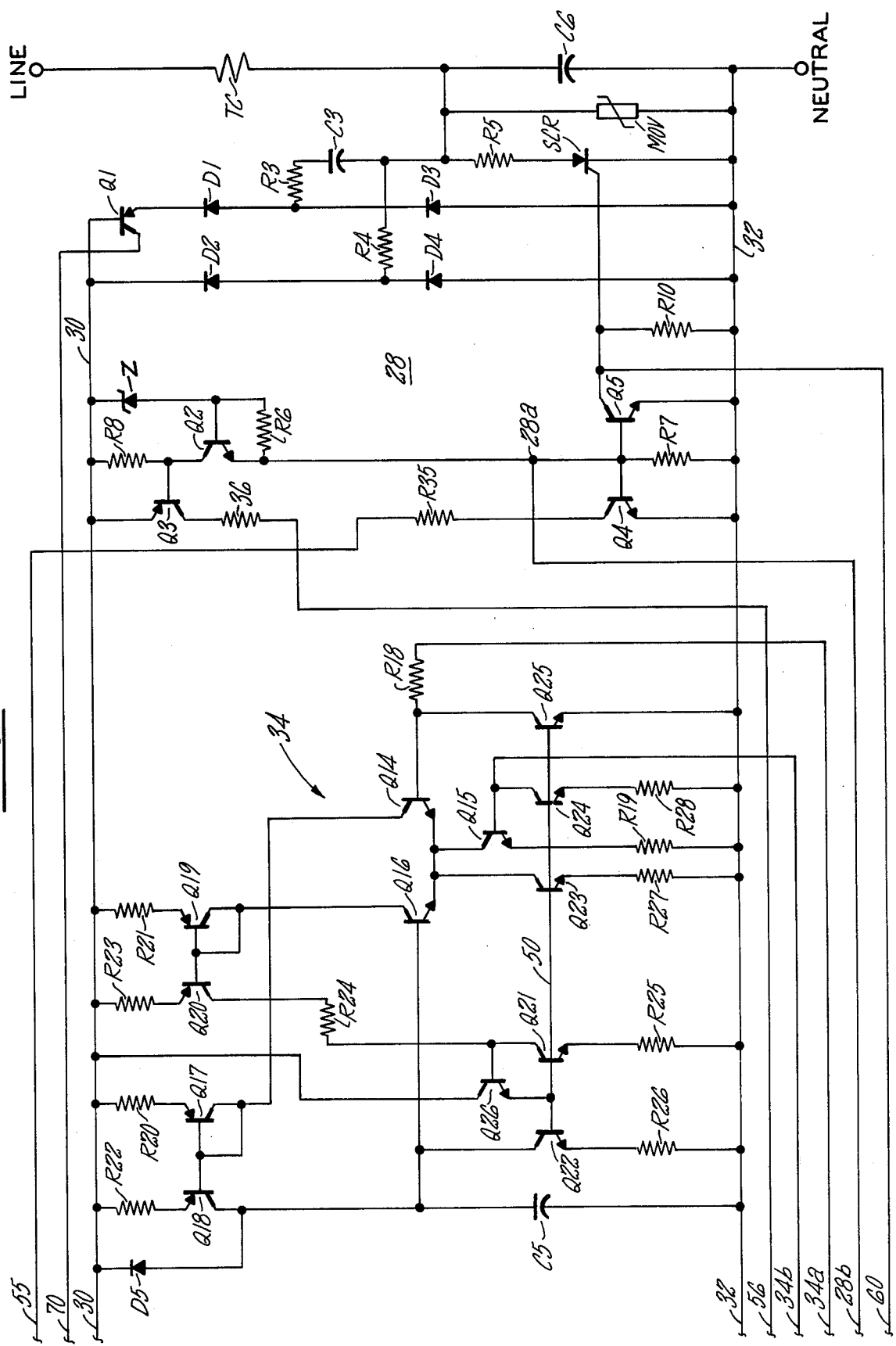
Figure 4:
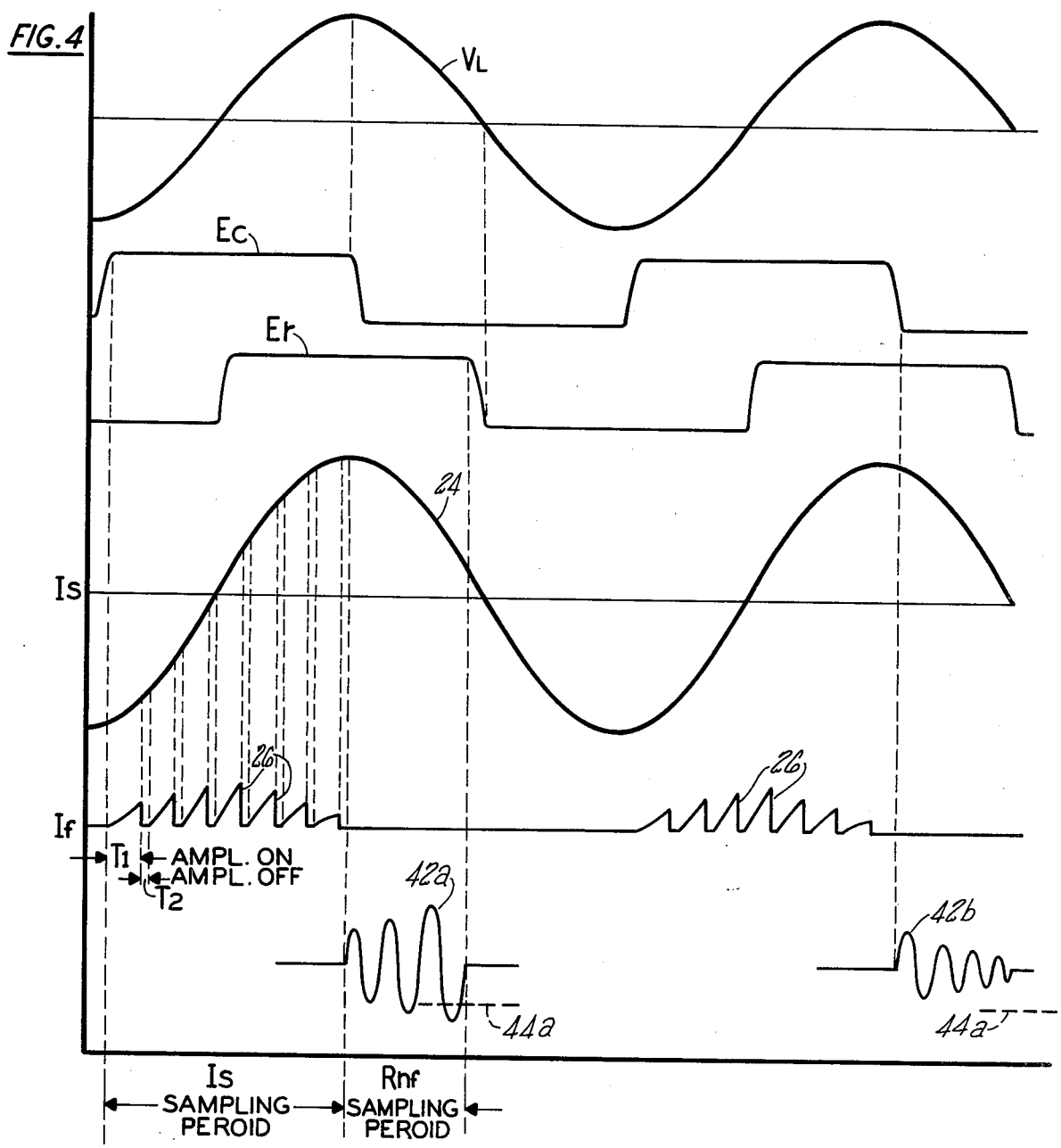
Figure 5:
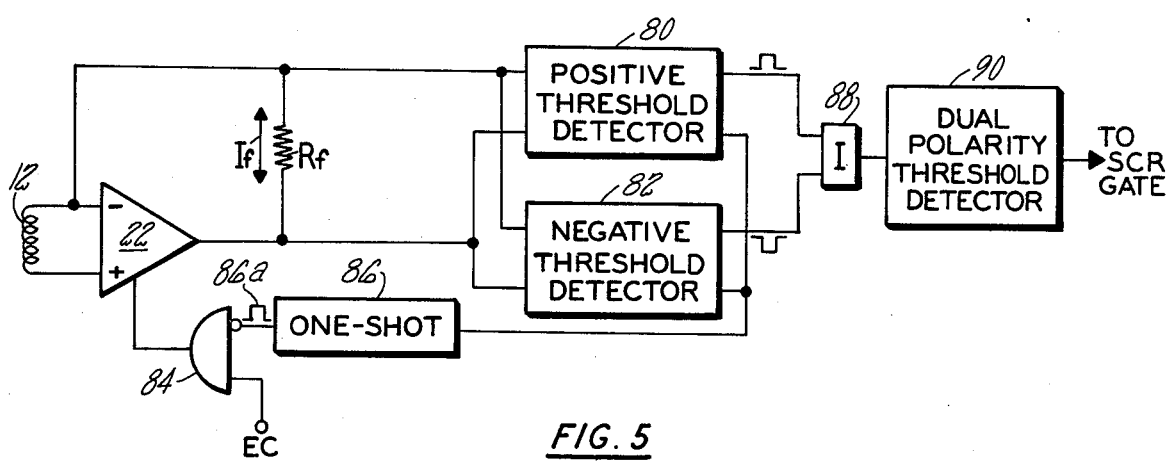

FIGS. 3A and 3B, when joined end to end, comprise a detailed circuit schematic diagram of the signal processor of FIG. 1;

FIG. 4 is a timing diagram illustrating various electrical waveforms present in the circuit of FIG. 1; and FIG. 5 is a partial block diagram of a GFCI device constructed in accordance with an alternative embodiment of the present invention.

Like reference numerals refer to corresponding parts throughout the several views of the drawings.

DETAILED DESCRIPTION

The ground fault circuit interrupting (GFCI) device of the present invention includes, as seen in FIG. 1, a single transformer, specifically a differential current transformer DX, having a toroidal core 10 through which the line conductor L and neutral conductor N of a power distribution circuit pass as preferably single-turn primary windings. The neutral conductor is grounded at the source, as is conventional practice.

Wound around core 10 is a multi-turn secondary winding 12 in which is developed a current indicative of an imbalance in the currents flowing in the line and neutral conductors of the distribution circuit. This secondary current is supplied to a signal processor, generally indicated at 14. The series combination of a trip coil TC and a thyristor SCR is connected across the line and neutral conductors. As will be seen, the signal processor 14 functions to develop a triggering voltage on the gate of thyristor SCR upon the existence of a high impedance ground fault 16 on the line conductor or a low impedance ground fault 18 on the neutral conductor. In response to this triggering voltage, the thyristor SCR is switched to its highly conductive state, thereby completing a low impedance energization circuit for trip coil TC. Actuation of the trip coil causes contacts 20, serially included in the line side of the distribution circuit, to open, thereby interrupting the distribution circuit.

One side of secondary winding 12 is connected to the inverting input and the other side to the non-inverting input of a differential current amplifier 22, which can be, for example, an operational transconductance amplifier CA 3060 supplied by RCA. This amplifier is equipped with large negative feedback such that when it is turned ON, its input impedance is extremely low, to the point of presenting a virtual short circuit across the secondary winding 12. Conversely, when amplifier 22 is turned OFF, its input impedance is extremely high, such that secondary winding 13 is operating into a virtual open circuit. A switch S operates to turn amplifier 22 ON and OFF.

Figure 2:
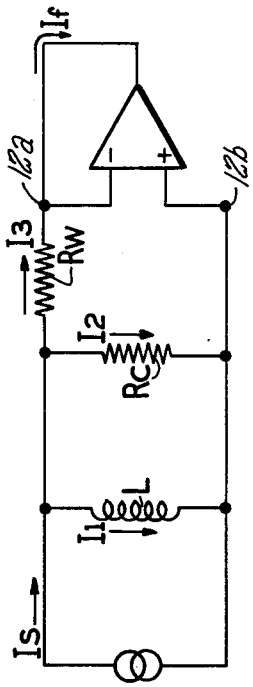
FIG. 2 is an equivalent circuit diagram of the differential current transformer of FIG. 1.

To facilitate an understanding of the operating principles underlying the present invention, reference is now made to FIG. 2 wherein an equivalent circuit of the differential transformer secondary is illustrated. The primary differential current transforms to a secondary current Is of a magnitude determined by the primary current imbalanced multiplied by the turns ratio, i.e., 1/Ns, where Ns equals the secondary turns. This secondary current is divided among three parallel equivalent circuit paths. Thus, the secondary current, in effect, splits into a current $I_1$ flowing through an inductance L representing the magnetizing inductance of the transformer secondary, a current $I_2$ flowing through a resistor Rc representing the losses in core 10, and a current $I_3$ flowing through a resistor Rw (wire losses). By utilizing a ferrite core material, the equivalent core loss resistance Rc is quite large. Thus current $I_2$ in the equivalent circuit is essentially zero and can be neglected for purposes of this description. During the time amplifier 22 is turned OFF to present essentially an open circuit across equivalent circuit terminals 12a, 12b, all of the secondary current Is may be considered as flowing through the inductance L. The terminal voltage is then L(dIs/dt), and the core flux density is the function of the secondary current. During the time amplifier 22 is turned ON to present a virtual short circuit across terminals 12a, 12b, all of the secondary current Is flows as current $I_3$ out the secondary terminal 12a and through the amplifier feedback path as current If, i.e., Is=$I_3$=If. Reference is made to commonly assigned U.S. Pat. No. 3,815,013 for a detailed description of the effects of operating a current transformer secondary into a short-circuiting, large negative feedback transresistance amplifier. Since secondary current does not flow through the inductance L during the short-circuited mode, it, as well as feedback current If, is virtually unaffected by core permeability. Assuming the wire resistance Rw to be very low, virtually no voltage exists across inductance L. Hence, dI/dt must be zero in the inductance L, which also mandates that the core flux density does not change, since E=Ndφ/dt.

While the equivalent circuit terminals 12a, 12b are open circuited, flux in core 10 is established by the instantaneous primary current (Ip=NIs) and readily changes with variations in the primary current. Since the flux in the core cannot change while the secondary terminals 12a, 12b are short circuited, the flux that exists in the core at the time the short circuit is imposed is trapped and held in the core. The existence of trapped flux causes amplifier to produce a feedback current If, which in terms of the equivalent circuit of FIG. 2 can be considered as flowing through the inductance L in a direction to maintain the core flux constant. Since this trapped flux produced feedback current will appear regardless of whether or not secondary current Is is present, it is seen that the existence of trapped flux creates the situation where the amplifier feedback current is not truly reflective of the secondary current.

Another factor affecting feedback current If is the inherent amplifier offset voltage. When the amplifier 22 is ON, a feedback current will be caused to flow through the inductance L for developing a voltage thereacross which is effective to cancel the offset voltage pursuant to creating a zero voltage differential between the two amplifier inputs. This offset voltage induced feedback current likewise appears irrespective of secondary current Is. As will be seen, the signal processor 14 of the present invention operates to minimize the affects on feedback current If caused by flux trapped in the core and amplifier offset voltage by cycling the amplifier between ON and OFF conditions.

Returning to FIG. 1, amplifier 22 is cycled or gated ON and OFF by switch S. While the amplifier is OFF, its feedback current is zero and the core flux in transformer DX is established in accordance with the secondary current, which is equal to the differential current in the line and neutral conductors of the distribution circuit divided by the secondary turns. While the amplifier 22 is gated ON by switch S, the feedback current If follows the change in secondary current from its instantaneous value existing at the time the amplifier is gated ON. This can be seen from FIG. 4 wherein the 60 Hertz sinusoidal waveform 24 represents the secondary current Is, and the series of pulses 26 represents feedback current If which flows in the amplifier feedback path through an integrating capacitor C1 while amplifier 22 is gated ON. It is seen that during each time interval T1 while the amplifier is ON, the feedback current If follows the slope of the secondary current waveform 24 existing during the ON time interval. In the illustration of FIG. 4, since the slope of the secondary current waveform is positive, i.e., a positive dI/dt, the feedback current pulses are positive. During the time interval T2 while the amplifier is OFF, the feedback current If goes to zero. When the amplifier is turned ON during the next T1 time interval, the feedback current again follows the slope of the secondary current waveform 24, and returns to zero when the amplifier is gated OFF. While the slope of the secondary current waveform is positive, the feedback current pulses 26 are all positive pulses. If the amplifier was gated ON and OFF over the period when the secondary current waveform 24 had a negative slope, then all of the feedback current pulses would be negative pulses.

It is thus seen that if the feedback current pulses 26 were integrated in capacitor C1 over a complete cycle of the secondary current, the net charge on the capacitor would be zero. Accordingly, it is an important feature of the present invention that amplifier 22 only be gated ON and OFF during alternate half cycles of the secondary current waveform 24 when its slope is of one polarity. Under these circumstances, there is developed a charge on integrating capacitor C1 which is indicative of not only the existence of secondary current, but also its amplitude.

It is also an important feature of the present invention that the amplifier 22 be gated ON and OFF numerous times during each half cycle long secondary current sampling period, so as to create a plurality of discrete sampling intervals. It will be appreciated that if a typical high frequency damped oscillary current transient (noise) occurs during a sampling interval T1, the feedback current If will have the same oscillatory waveshape and will not, therefore, add any net charge to the integrating capacitor C1. However, if the current transient occurs during an interval T2 when amplifier 22 is OFF, and if the amplifier is turned ON to begin a sampling interval T1 while that transient current exists, the core flux produced by the transient current is trapped and held for the entire sampling interval. This noise produced trapped flux will, as previously noted, result in a proportional amplifier feedback current which flows during the entire sampling interval. If only one sampling interval of a full half cycle duration (approximately 8 milliseconds) was utilized, a repetitive noise current of short duration, for example, 50 microseconds, occurring at the start of each half cycle sampling interval would have the same effect as a 5 milliamp ground fault current. Thus, it is highly beneficial to utilized a plurality of short sampling intervals T1 during each half cycle sampling period. Under these circumstances, the trapped flux occasioned by a short duration current transient will only affect the feedback current during one sampling interval time T1 and will be released during the next interval T2 when the amplifier is OFF, permitting the core flux to change. It is seen that if 16 sampling intervals T1 are implemented during each half cycle sampling period, a single short duration transient current will have a net affect on the feedback current If which is proportional to 1/16th (6.25%) of its magnitude.

Also as previously noted, the multiple sampling intervals inherently mitigates the effects of amplifier offset voltage. Since second winding 12 is connected directly to the differential inputs of amplifier 22, if the amplifier was turned ON continuously, the feedback current If would have to develop a voltage across the winding resistance Rw equal to the amplifier input offset voltage. Even for small offset voltages, for example, 200 microvolts, the relatively low winding resistance (10 ohms for 300 turns of 38 gauge wire), would require a relatively high feedback current in order to develop a requisite voltage across the secondary winding to cancel out the amplifier offset voltage. In fact, the feedback current occasioned by amplifier offset voltage would, under these circumstances, exceed the feedback current occasioned by a 5 milliamp differential primary current, which is the requisite trip threshold. However, by repetitively gating amplifier 22 ON and OFF, the requisite voltage to cancel the offset voltage is instead developed across the secondary inductance by a linear ramp feedback current. If the duration of each sampling interval T1 is 500 microseconds, and assuming an offset voltage of 200 microvolts and a secondary inductance L of 0.3 henries, the peak feedback current, as occasioned by offset voltage, existing at the end of each sampling interval is 0.33 microamperes. Assuming 300 secondary turns, the secondary current for a 5 milliampere ground fault current (primary differential current) is 16.7 microamperes RMS. Within one sampling interval T1, the maximum change in secondary current for a 5 milliamp ground fault current is 4.44 microamperes. Integration over a full half cycle sampling period consisting of 20 sampling intervals T1 reduces the effect of a 200 microvolt amplifier offset voltage to less than 10% of a 5 milliamp ground fault signal, in terms of the charge developed on integrating capacitor C1.

Still referring to FIG. 1, the signal processor 14 includes a regulated power supply 28, energized from a junction between trip coil TC and thyristor SCR for developing on bus 30 a regulated supply voltage which is positive with respect to a ground bus 32 directly connected to neutral conductor N of the distribution circuit. Connected across buses 30 and 32 is a dual ramp oscillator 34 which is operatively connected to switch S pursuant to gating amplifier 22 ON and OFF. By way of example, oscillator 32 may be designed to gate amplifier 22 ON for sampling intervals T1, each of 450 microseconds duration. The intervening intervals T2 during which amplifier 22 is gated OFF may each be of 50 microseconds duration. Under these circumstances, at least 10 and as many as sixteen sampling intervals T1 can be accommodated in each sampling period, assuming a 60 Hertz line frequency. The non-inverting input of amplifier 22 to which one side of secondary winding 12 is connected is referenced to a junction 25 of a voltage divider, generally indicated at 36, at which a reference voltage of one-half the supply voltage on bus 30 is developed. The voltage developed across capacitor C1 as the result of the integration of the amplifier feedback current pulses If over a ground fault or secondary current sampling period is monitored by a Is threshold detector 38. If the voltage developed across capcitor C1 exceeds a predetermined threshold level, signifying a ground fault current of trip level magnitude, detector 38 develops a triggering voltage on the gate of thyristor SCR which then fires to draw sufficient current through trip coil TC to initiate opening of contacts 20, interrupting the distribution circuit. Integrating capacitor C1 is shunted by a large discharge resistor R1, such that a portion of the charge on capacitor C1 may leak off in the intervals between chargings.

Since the period during which samplings of the differential transformer secondary current are taken pursuant to sensing the existence of a line-ground fault 16 consumes only one-half cycle of the line frequency, there remains a half cycle during which the signal processor may be utilized to detect the existence of a low impedance, desensitizing neutral-ground fault 18. To this end, secondary winding 12 is connected in circuit with a capacitor C2 to form a resonant tank circuit at some frequency higher than line frequency, for example, 5,000 Hertz, and this tank circuit is coupled with a negative resistance network 40. This negative resistance network functions to control switch S1 in turning amplifier 22 OFF and is also arranged to produce prescribed shock excitation of the tank circuit to establish therein a ringing oscillatory wave of a given initial amplitude. This approach to detecting the existence of a low impedance neutral ground fault 18 is fully disclosed in my above-noted U.S. Pat. No. 4,001,646. If the neutral conductor L is not grounded through a low impedance fault, the negative resistance network will cause the ringing oscillation amplitude to increase with time. On the other hand, if the neutral conductor N is connected to ground through a fault of sufficiently low impedance as to desensitize the GFCI device in its ability to detect the full magnitude of ground fault current, the ringing oscillation set up in the tank circuit will be degenerative. Consequently, its amplitude decreases with time.

Referring to FIG. 4, reference numeral 42a indicates a regenerative ringing oscillation which exists in the tank circuit when the neutral conductor is not faulted to ground or the impedance of a neutral ground fault 18 is sufficiently high as to not be desensitizing. Reference numeral 42b, on the other hand, indicates a ringing oscillation in tank circuit which is degenerative, thereby signifying that the neutral conductor is connected to ground through a desensitizing low impedance ground fault. A ring threshold detector 44, seen in FIG. 1, monitors the ringing oscillation in the tank circuit to determine if its amplitude increases to a negative level below a threshold level 44a established by the reference voltage existing at junction 35 of voltage divider 36. If at some time during the neutral-ground impedance sampling period, a negative peak of the ringing oscillation falls below the established ring detector threshold level 44a (FIG. 4), nothing happens. On the other hand, if the ringing oscillation is degenerative, or not sufficiently regenerative as to develop a negative peak voltage during the sampling period which dips below threshold level 44a, ring threshold detector 44 issues a current pulse to charge capacitor C1. After several cycles of these current charging pulses issued by ring threshold detector 44, a voltage is developed across capacitor C1 which corresponds to a 5 milliampere ground fault current. This voltage is detected by threshold detector 38, pursuant to firing thyristor SCR, whereupon a ground fault trip function is initiated.

Turning now to the detailed circuit schematic diagram of signal processor 14 seen in FIGS. 3A and 3B, current is drawn from the line conductor L through trip coil TC, a capacitor C3, a resistor R3, diode D1 and the emitter-base junction of a transistor Q1 in power supply 28 to the positive supply voltage bus 30, as seen at the right end of FIG. 3B. Line current is also drawn through the trip coil, a resistor R4 and a diode D2 to bus 30. By virtue of the presence of capacitor C2, the current on bus 30 obtained via the emitter-base junction of transistor Q1 leads the current on the bus via diode D2 by ¼ of a cycle of the line frequency. Thus, the power supply voltage appearing on bus 30 has two components, each of one-half cycle duration, with the component derived through resistor R4 and diode D2 shifted ¼ cycle later than the component derived through capacitor C2 and transistor Q1. This situation is graphically illustrated in FIG. 4 wherein the 60 Hertz sinusoidal line voltage is indicated a V, the supply voltage component derived via capacitor C3 is indicated at Ec, and the component obtained through diode D2 is indicated at Er. These two voltage components combined on bus 30 to provide a supply voltage which exists for ¾ of a cycle at the line frequency. It will be noted that the capacitive supply voltage component Ec comes up as the line voltage sinusoid swings into a positive slope from its negative peak. When the line voltage sinusoid starts into its negative slope from a positive peak, the capacitive supply voltage component goes down.

As will be seen, this capacitive supply voltage component Ec is utilized to coordinate or synchronize the differential transformer secondary current sampling period to the line voltage sinusoidal waveform such that the polarity of the secondary current waveform is the same throughout the sampling period. As previously noted, this condition results in amplifier feedback current pulses 26 which are all of the same polarity and thus susceptible to integration in capacitor C1 pursuant to developing a voltage accurately reflecting the magnitude of any ground fault current.

As will also be seen from the description to follow, synchronous threshold detector 38 (FIG. 1) is a dual polarity threshold detector capable of accommodating the situation where the line voltage and the differential transformer secondary current are 180° out of phase. This situation obtains when the line and neutral connections to a GFCI device are reversed, as can readily be done when installing a GFCI receptacle. It will be noted however that synchronous detection is still achieved since the slope of the secondary current waveform during the sampling period defined by the presence of the capacitive supply voltage component Ec is simply uniformly negative in slope, rather than positive. Thus, the amplifier feedback current pulses 26 simply appear as negative, rather than positive, pulses, which nevertheless can be integrated in capacitor C1. The polarity of the voltage developed across the integrating capacitor is simply reversed. As will be seen, the threshold detector 38 is equipped to, in effect, detect the absolute value of the voltage developed across integrating capacitor C1, and, if it exceeds a predetermined threshold level, initiate a trip function.

Still referring to the right end of FIG. 3B, a current limiting resistor R5 is connected between the anode of thyristor SCR and trip coil TC. A metal oxide varistor MOV is connected across the series combination of resistor R5 and thyristor SCR to provide voltage surge protection, while a filtering capacitor C6 is connected across the MOV. A diode D3 is connected from the junction of diode D1 and resistor R3 down to ground bus 32 to permit reversal of charge polarity on capacitor C3 during negative half-cycles of the line voltage, while a diode D4 is connected from the junction of diode D2 and resistor R4 down to the ground bus to limit the negative voltage appearing at the anode of diode D2 during negative half-cycles of the line voltage.

Also included in power supply 28 is a shunt voltage regulator operating to achieve a regulated level of positive supply voltage on bus 30. When the leading capacitive supply voltage component Ec (FIG. 4) rises to the desired regulated level, Zener diode Z breaks down to conduct current through resistors R6 and R7 to ground bus 32. When sufficient Zener current flows through resistor R6 to forward bias the base-emitter junction of transistor Q2, this transistor turns on to establish a shunt voltage regulating current path between buses 30 and 32 via resistor R7 and R8. As the supply voltage on bus 30 attempts to rise above the desired regulated level, more Zener current flows through resistor R6, increasing the forward bias on transistor Q2. The conduction of this transistor is increased to shunt more current from bus 30 to bus 32. Consequently, the voltage on bus 32 is effectively clamped to the desired regulated supply level. With transistor Q2 conductive, base drive current is made available to turn transistor Q3, Q4 and Q5 on. As will be seen, transistors Q3 and Q4, while conductive, activate the dual polarity Is threshold detector 38, while the conduction of transistor Q5 shorts the gate and cathode of thyristor SCR so as to inhibit the development of any triggering voltage across gate resistor R10.

Turning now to the left end of FIG. 3A, the voltage divider network 36 is seen to include transistors Q6 and Q7, diode connected transistors Q8 and Q9, and equal valued resistors R11 and R12. The collectors of transistors Q6 and Q7 are respectively connected to buses 30 and 32, while their emitters are connected in common at junction 35 where a solid reference voltage equal to half the supply voltage on bus 30 is to be established. The base of transistor Q6 is connected in common with the base and collector of transistor Q8 and thence through resistor R11 to bus 30. Similarly, the collector and base of transistor Q9 are together connected to the base of transistor Q7 and through resistor R12 and the collector-emitter circuit of a transistor Q10 to bus 32. The emitters of transistors Q8 and Q9 are connected together. When bus 30 goes into voltage regulation, the voltage appearing at junction 28a in power supply 28 (FIG. 3B) is applied via lead 28b to the base of transistor Q10, turning this transistor ON to complete the circuit between resistor R12 and ground bus 32. It is thus seen that the voltage divider 36 is activated pursuant to establishing the reference voltage at junction 35 only when the signal processor is in voltage regulation.

With transistor Q10 conductive, base drive current can then be drawn from bus 30 through resistor R11 for turning transistors Q6–Q9 on. If these transistors are identical and with the resistors R7 and R8 equal valued, the voltage at the common emitters of transistors Q8 and Q9 is established at one-half the regulated supply voltage at junction 35 common to the emitters of transistors Q6 and Q7. It is seen that by virtue of the illustrated construction of voltage divider network 36, the reference voltage established at junction 35 is quite solid, regardless of loading. This is seen from the fact that should the voltage at junction 35 attempt to rise, the base-emitter voltage on transistor Q7 increases, causing this transistor to draw more current and pull the voltage at junction 35 back down. Similarly, if the voltage at junction 35 attempts to fall, transistor Q6 draws more current to pull the voltage at this junction back up.

As illustrated in both FIGS. 1 and 3A, one side of the differential transformer secondary winding is directly connected to the inverting input of amplifier 22, while the other side is connected commonly with junction 35 and the non-inverting input of amplifier 22. The amplifier negative feedback path includes the parallel combination of integrating capacitor C1 and discharge resistor R1. Resonating capacitor C2 and damping resistor R13 are connected in series across the primary winding. Resistor R14 and capacitor C4 provide high frequency bypass for amplifier 22. Operating power for the amplifier is obtained across buses 30 and 32, as seen in FIG. 3A.

The bias input for amplifier 22 is brought out to a gate bus 22a from which bias current is obtained from the reference voltage junction 35 through resistor R15. Gate bus 22a can be shorted to ground bus 32 through the collector-emitter circuits of either transistors Q11 or Q12. It will be appreciated that if gate bus 22a is grounded through either one of these transistors, amplifier 22 is deprived of bias current and thus is gated OFF. While the supply voltage on bus 32 is rising toward its regulated level, transistor Q11 receives base drive via the divider network 36. This transistor is then conductive to ground gate bus 22a, thus insuring that amplifier 22 is gated OFF during this transitional interval. Once the signal processor circuit goes into voltage regulation, transistor Q10 turns on to shunt base drive current from transistor Q11, which then turns off to remove the ground from gate bus 22a imposed through its collector-emitter circuit. Amplifier 22 will then be gated ON, assuming gate bus 22a is not grounded through the collector-emitter circuit of transistor Q12. As will be seen, transistor Q12 is driven into conduction to gate amplifier 22 OFF from the negative resistance network 40 during the period when signal processor 14 operates to detect the presence of a low impedance ground fault on the neutral conductor.

It will be assumed that the signal processor is entering into the half cycle long secondary current or ground fault current sampling period, and thus transistor Q12 is held non-conductive by the negative resistance network 40. Gating control of amplifier 22 is thus left to amplifier gating oscillator 34, which will now be described in detail with reference to FIG. 3B. The reference voltage at junction 35 is supplied via lead 34a and resistor R18 to the base of a transistor Q14 included in oscillator 34. Gate bus 22a in FIG. 3A is connected via lead 34b to the base of a transistor Q15. Since the gate bus is not grounded through either transistor Q11 or Q12, transistor Q15 is turned on to complete a circuit for the emitter of transistor Q14 through resistor R19 to ground bus 32. Transistor Q14 is connected as a differential pair with transistor Q16, and thus their emitters are tied together to the collector of transistor Q15. Collector current for transistor Q14 is obtained from bus 30 via resistor R20 and the emitter-collector circuit of transistor Q17 connected as a diode with transistor Q18 is conventional current mirror fashion. Collector current for transistor Q16 is obtained from bus 30 via resistor R21 and the emitter-collector circuit of transistor Q19 connected as a diode with transistor Q20, also in conventional current mirror fashion. The emitter of transistor Q18 is connected to bus 30 via a resistor R22, while its collector is connected to bus 32 via a timing capacitor C5. The emitter of transistor Q20 is connected to bus 30 via resistor R23, and its collector is connected to bus 32 via resistor R24, the collector-emitter circuit of transistor Q21, and resistor R25. Transistor Q22, connected in current mirror fashion with transistor Q21, has its collector connected to the junction between capacitor C5, the collector of transistor Q18 and the base of transistor Q16, while its emitter is connected to bus 32 through resistor R26. The bases of transistors Q21 and Q22 are connected to a common base bus 50, to which the bases of transistors Q23, Q24 and Q25 are also connected. The base-collector junction of transistor Q21 is shunted by the base-emitter junction of a transistor Q26, whose collector is directly connected to bus 30. The emitters of transistors Q23 and Q24 are connected to bus 32 through resistors R27 and R28, respectively, while the emitter of transistor Q25 is directly connected to the ground bus.

The operation of oscillator 34 is basically as follows. When transistor Q15 is turned on from gate base 22a via lead 34b, the transistor Q14, Q16, differential pair is activated. The reference voltage at junction 35, communicated via lead 34a to the base of transistor Q14, turns this transistor on. Collector current for transistor Q14 is drawn through transistor Q17, resulting in an equal and constant current being drawn through the emitter-collector circuit of transistor Q18 for charging capacitor C5, assuming resistors R20 and R21 to be of equal value. Capacitor C5 charges linearly, raising the voltage at the base of transistor Q16. When this voltage becomes equal to the voltage on the base of transistor Q14, the differential transistor pair switches in that transistor Q16 turns on and transistor Q14 turns off. The current mirror comprised of transistor Q17 and Q18 turns off to terminate the flow of charging current into capacitor C5.

Collector current for transistor Q16 is drawn through transistor Q19, which in turn calls for proportionate current flow through the emitter-collector circuit of transistor Q20. The collector current of this transistor flows through resistor R24 and the base-emitter junction of transistor Q26 into the bases of transistors Q21-Q25 via base bus 50, turning all of these transistors on. The conduction of transistor Q25 pulls the base of transistor Q14 down toward the ground bus 32, thereby achieving regenerative switching of the transistor differential pair. The conduction of transistor Q24 ties amplifier gate bus 22a (FIG. 3A) to the ground bus, gating amplifier 22 OFF. Base current is diverted from transistor Q15, which turns off. The conduction of transistor Q23, transistor Q15, serves to draw more current through transistor Q16 than was drawn through transistors Q12 and Q15 during the charging of capacitor C5. Collector current for transistors Q16 is obtained from transistor Q19, which, in turn, calls for proportionate currents in transistors Q21 and Q22. Transistor Q22 draws its collector current from capacitor C3, and consequently this capacitor is discharged at a controlled, constant rate which is more rapid than the rate at which it was charged. When the timing capacitor C5 is sufficiently discharged that the voltage at the base of transistor Q16 starts to fall below the low potential imposed at the base of transistor Q14 by the conduction of transistor Q25, meaning that the capacitor is approaching complete discharge, the transistor Q14, Q16 differential pair again switches, with transistor Q14 turning on and transistor Q16 turning off. Transistors Q19 and Q20 likewise turn off, depriving transistors Q21-25 of base drive. These transistors also turn off to establish the conditions for recharging timing capacitor C5 with amplifier 22 again gated ON. As previously mentioned, an appropriate charging time for capacitor C5 may be 450 microseconds, pursuant to establishing a sampling interval T1 of that duration, while the discharge time for capacitor C5 may be 50 microseconds pursuant to establishing the interval T2 when amplifier 22 is gated OFF. Diode D5, connecting the upper side of capacitor C5 to bus 32, insures that this capacitor is fully discharged as the signal processor 14 starts into each secondary current sampling period.

Turning now to FIG. 3A, to monitor the charge developing across integrating capacitor C1 during the secondary current sampling period, the voltage at its lower terminal common with the inverting input of amplifier 22 is applied via the base-emitter junction of emitter follower transistor Q30 and the base-emitter junction of emitter following transistor Q31 to a junction 52 included in a voltage divider network consisting of resistors R30-R34 and connected between buses 30 and 32. It will be noted that the base-emitter voltage drops in transistors Q30 and Q31 cancel each other such that the voltage appearing at junction 52 is essentially the same as the reference voltage at junction 35; the voltage across differential current transformer secondary winding 12 being in the microvolt range. The voltage at junction 53, offset positively from the reference voltage at junction 52 by the voltage drop across resistor R32, is applied to the base of a transistor Q32 included in Is threshold detector 38. This transistor is connected with transistor Q33 as a differential pair. Similarly, the voltage at junction 54, offset negatively from the reference voltage at junction 52 by the voltage drop across resistor R33, is applied to the base of a transistor Q34 connected with transistor Q35 as a differential pair. The common emitters of transistors Q32 and Q33 are connected via lead 55 and resistor R35 to the collector of transistor Q4 in the power supply 28 (FIG. 3B). Similarly, the common emitters of transistors Q34 and 35 are connected via lead 56 and resistor R36 to the collector of transistor Q3 in power supply 28. It will be recalled that as long as the supply voltage on bus 30 is in regulation, transistors Q3 and Q4 are conducting. Thus, while the circuit is in regulation, the emitters of transistors Q32 and Q33 are connected to the ground bus 32, while the emitters of transistors Q34 and Q35 are connected to bus 30. These two transistor differential pairs thus become activated as soon as signal processor 14 goes into voltage regulation.

To sense the voltage across integrating capacitor C1, its upper end is applied via lead 58 to the base of transistor Q33 and thence via lead 58a to the base of transistor Q35. As long as the positively offset reference voltage at junction 53 exceeds a voltage across capacitor C1 which is positive with respect to the reference voltage at junction 35, transistor Q32 is conductive, while transistor Q33 is cut off. Current is drawn from bus 30 through diode connected transistor Q36, transistor Q32, lead 55, resistor R35 and transistor Q4 to ground bus 32. Similarly, as long as the negatively offset reference voltage at junction 54 is lower than a voltage on capacitor C1 which is negative relative to the reference voltage at junction 35, transistor Q34 is conductive and transistor Q35 is cut off. Current is drawn from bus 30 through transistor Q3, resistor R36, lead 56, transistor Q34 and diode connected transistor Q37 to ground bus 32.

Transistor Q36 is connected with transistor 38 as a current mirror, while transistor Q37 is connected with transistor Q39 as a current mirror. Current flow through the emitter-collector circuit of transistor Q36 pulls base current through transistor Q38, however collector current for this transistor is blocked by the non-conduction of transistor Q33. Transistor Q38 goes into saturation. Similarly, current flow through the collector-emitter circuit of transistor Q37 drives base current into transistor Q39, however the non-conduction of transistor Q35 blocks the flow of any collector current and transistor Q39 also goes into saturation.

If a positive voltage (relative to the reference voltage at junction 35) developing across capacitor C1 rises above the positive offset voltage at junction 53, transistor Q33 turns on, forcing transistor Q32 to turn off. Current is now drawn through the emitter-collector circuit of transistor Q38, diode D6, the collector-emitter circuit of transistor Q33, lead 55, resistor R35 and the collector-emitter circuit of transistor Q4 (FIG. 3B). Transistor Q38 pulls out of saturation, and base drive current can thus be drawn through transistor Q40, turning it on. The collector of this transistor is connected via a diode D7 and a resistor R40 to the base of transistor Q33. It is thus seen that the conduction of transistor Q40 abruptly pulls the voltage at the base of transistor Q33 upwardly toward the supply voltage on bus 30, achieving regenerative switching of the differential pair (transistors Q32, Q33) when the voltage on capacitor C1 exceeds the positive offset voltage at junction 53.

When this differential pair does switch, transistor Q41 is biased on and collector current is drawn from bus 30 through resistor R41 and also through the emitter-base junction of transistor Q42. This latter transistor also turns on to conduct base drive current for transistor Q43, which goes into conduction. The collector of this transistor is connected to bus 30, while its emitter is connected via lead 60 to the collector of transistor Q5, included in power supply 28 of FIG. 3B. It will be recalled that transistor Q5 is rendered conductive while the signal processor is in voltage regulation to short the cathode and gate of thyristor SCR. However, with the conduction of transistor Q43 in threshold detector 38, it is seen that buses 30 and 32 are connected together through the low impedance collector-emitter circuits of transistors Q43 and Q5. This drops the supply voltage on bus 30 down sufficiently that the signal processor is pulled out of voltage regulation. Zener diode Z ceases to conduct, and transistor Q5 turns off to switch in gate resistor R10. Consequently, the supply voltage is effectively applied directly across resistor R10 to develop a solid gate voltage for triggering thyristor SCR into conduction, pursuant to initiating a ground fault trip function.

In analogous fashion, if a negative voltage (with respect to the reference voltage at junction 35) developing across capacitor C1 falls below the negative offset voltage at junction 53, the transistor Q34, Q35 differential pair switches. The collector current of transistor Q35 flows through diode D7 into the base of transistor Q44 as transistor Q39 pulls out of saturation. Transistor Q44 has its emitter connected to bus 32 and its collector connected via a diode D9 and resistor R44 to the base of transistor Q35. The conduction of transistor Q44 pulls the voltage at the base of transistor Q35 down toward the ground potential on bus 32 to achieve regnerative switching of the transistor Q34, Q35 differential pair. Upon switching, transistor Q45 goes into conduction, supplying base current for turning transistor Q43 on. With the conduction of this transistor, the circuit is pulled out of voltage regulation, and transistor Q5 is cut off to switch in gate resistor R10 such that the current through transistor Q43 develops the requisite gate voltage thereacross for triggering thyristor SCR pursuant to initiating a ground fault trip function.

Diodes D6-D9 are included in Is threshold detector 38 to insure that the integrating capacitor cannot discharge through this detector circuitry until such time as the threshold level (positive or negative) is exceeded.

During the half cycle long transformer secondary current sampling period, the capacitive component Vc of the supply voltage Vs is up, and transistor Q50 in negative resistance network 40, as seen in FIG. 3A, is cut off by this capacitive supply voltage component as applied to its base from the collector of transistor Q1 (FIG. 3B) via lead 70. However, when this capacitive supply voltage component begins to fall off, signaling the end of the transformer secondary current sampling period, transistor Q50 goes into conduction to activate an array of current sources consisting of transistors Q51-Q56, whose emitters are respectively connected to bus 30 through resistors R51-R56. The bases of these transistors are connected to a common base bus 72, which is, in turn, connected to the emitter of transistor Q50. Collector current from transistor Q51 turns transistor Q12 on to short gate bus 22a to ground bus 32, gating amplifier 22 OFF. Collector current from transistor Q52 flows through the emitter-collector circuit of transistor Q50 into the base of transistor Q57. This transistor turns on to short out damping resistor R13 and to connect capacitor C2 in parallel with differential current transformer secondary winding 12, forming therewith a resonant tank circuit. The collector current for transistor Q52, flowing through the base-emitter junction of transistor Q57, shock excites this tank circuit, setting up a ringing oscillation therein. Transistors Q52 and Q53 are interconnected as a current mirror, and thus the collector current in transistor Q52 produces an equal collector current in transistor Q53; assuming resistor R52 and R53 to be of equal value. The collector current in transistor Q53 flows through the collector-emitter circuit of transistor Q30 to develop a voltage across a resistor R57.

If, due to this ringing oscillation, the voltage at the base of transistor Q30 rises, its base-emitter voltage is increased, causing its collector current to increase accordingly. Since transistor Q30 collector current is obtained from the collector of transistor Q53, the collector current of transistor Q53 must increase correspondingly. This forces a corresponding increase in the collector current of transistor Q52, which is pumped into the tank circuit via the base-emitter junction of transistor Q57. It is thus seen that there is created a network which effectively presents a negative resistance to the tank circuit of a value determined by the resistance of resistor R57. Included in the tank circuit is the reflected resistance value of any ground fault 18 (FIG. 1) on the neutral conductor which connects the neutral conductor in a closed loop. The resistance of resistor R57 is selected such that the ringing oscillation of the tank circuit will be regenerative if the resistance of any neutral ground fault is above a predetermined value and degenerative if the fault resistance is below this predetermined value. Thus, this negative resistance network functions as a threshold detector of the resistance value of any ground fault in the neutral conductor. For a detailed discussion of the functioning of a negative resistance network in this roll, reference is again made to Applicant's U.S. Pat. No. 4,001,646.

The ringing oscillation in the tank circuit, centered on the reference voltage at junction 35, is coupled to junction 52 via emitter follower transistors Q30 and Q31. A positive offset of this ringing oscillation, appearing at junction 74 between resistors R30 and R31 of the voltage divider chain, is applied to the base of a transistor Q58 included in ring threshold detector 44. The reference voltage at junction 35, which constitutes threshold level 44a in FIG. 4, is applied via lead 76 to the base of a transistor Q59 connected with transistor Q58 as a differential pair. Current for this differential pair is obtained from the collector of transistor Q55, which flows through the emitter-collector circuit of normally conducting transistor Q59.

Assuming the resistance of any neutral ground fault to be greater than a threshold value of, for example, 4 ohms, the ringing oscillation in the tank circuit is regenerative and its amplitude thus increases with time. When the base of transistor Q58 sees a negative peak of this ringing oscillation fall below the threshold level 44a (FIG. 4) at the base of transistor Q59, this differential pair switches, in that transistor Q58 goes into conduction and transistor Q59 cuts off. The collector current of transistor Q58 turns on transistor Q60, which, in turn, conducts current from the base of transistor Q59, resistor R58 and its collector-emitter circuit into the base of transistor Q61. This transistor turns on to divert base drive current from transistor Q62 flowing from bus 30 through resistor R59. Transistor Q62, which receives collector current from the collector of transistor Q54, turns off, raising the voltage at the base of transistor Q63 and at the emitter of transistor Q64 from ground potential to a potential determined by the drop across a resistor R60 and the base-emitter voltage drop in transistor Q61. Transistor Q63 is thus sufficiently forward biased to go into saturation, connecting base bus 72 to ground bus 32 through resistor R61 and its own collector-emitter circuit. This has the effect of increasing the collector currents in transistors Q51–Q56. Transistor Q53 goes into saturation, raising the voltage at its collector sufficiently to cut transistor Q50 off. This, in turn, cuts transistor Q57 off, terminating the pumping of current into the tank circuit and, at the same time, switching damping resistor R13 back into the tank circuit. The abrupt termination of current flowing into the tank circuit produces a large negative voltage spike followed by critical damping of the oscillatory ring (not shown in FIG. 4). This large negative voltage spike appearing at the base of transistor Q58 produces regenerative switching of the transistor Q58, Q59 differential pair.

While the signal processor is in voltage regulation, the voltage at junction 28a of the power supply 28 (FIG. 3B), as applied via lead 28b to the base of a transistor Q67, drives this transistor into conduction. Collector current from transistor Q56 is diverted to bus 32, and the base of a transistor Q68 is clamped at ground potential. As the resistive component Vr of the supply voltage on bus 30 falls off, signaling the end of the neutral-ground resistance (Rnf) sampling period, Zener diode Z in the power supply 28 (FIG. 3B) ceases to conduct and the voltage at junction 28a goes to ground potential. Transistor Q67 cuts off to no longer divert base drive current from transistor Q68. This transistor, connected as a diode, then raises the voltage at the base of transistor Q64 up one base-emitter voltage drop from ground potential. The collector of transistor Q64 is connected via lead 58 to the upper terminal of capacitor C1. Since transistor Q62 had been cut off in response to the switching of transistor Q58, Q59 differential pair, thereby signifying that the ringing oscillation was regenerative, the emitter of transistor Q64 sits at a potential equal to the potential at its base, as determined by the base-emitter drop of transistor Q63. Consequently, transistor Q64 is cut off. It will be noted that while transistor Q62 and Q67 are both conductive, the base and emitter of transistor Q64 are both at ground potential, and thus this transistor is held non-conductive during the neutral-ground resistance sampling period.

On the other hand, if the ringing oscillation in the tank circuit is not regenerative, signifying a low impedance ground fault on the neutral conductor, e.g., 4 ohms or less, its negative never falls below threshold level 44a (FIG. 4) and the transistor Q58, Q59 differential pair will not switch, leaving transistor Q59 conductive. Consequently, transistors Q60 and Q61 are not turned on, and transistor Q62 is not turned off by the end of the neutral-ground resistance sampling period. The emitter of transistor Q64 thus remains at ground potential. At the end of the neutral-ground resistance sampling period when the supply voltage begins to fall off, transistor Q67 is cut off to raise the potential at the base of transistor Q64 up one base-emitter voltage drop from ground potential. It is then seen that transistor Q64 goes into conduction. With the conduction of both transistors Q64 and Q62, current is drawn from the reference voltage bus 35 through capacitor C1, placing a charge thereon. During the next succeeding transformer secondary current sampling period, the charge injected on capacitor C1 by the ring or Rnt threshold detector 44 is detected by the Is threshold detector 38, and a trip function is initiated if the voltage on the integrating capacitor exceeds the threshold level established for a 5 milliamp ground fault signal. Preferably, the parameters of ring threshold detector 44 are established such that several neutral-ground resistance Rnt sampling periods are required to develop a voltage on the integrating capacitor exceeding the threshold level established in detector 38.

An alternative approach to sensing differential transformer secondary current occasioned by differential primary current (ground fault current) in accordance with the present invention is shown in the block diagram of FIG. 5. Differential transformer secondary winding 12 is again connected directly to the inverting and non-inverting inputs of amplifier 22. Included in the amplifier negative feedback path is a resistor Rf through which feedback current If flows. The voltage developed across this resistor is monitored by a positive voltage threshold detector 80 and a negative voltage threshold detector 82. Synchronous detection of secondary current is again achieved using the capacitive supply voltage component Ec to define a half-cycle secondary current sampling period in synchronization with each line voltage cycle, as described in connection with FIGS. 3A, 3B and 4. This is functionally illustrated in FIG. 5 by the application of the capacitive supply voltage component Ec to amplifier 22 through normally enabled gate 84 to gate the amplifier ON. Thus, the amplifier presents a short-circuit to the secondary winding and feedback current If flows through feedback resistor Rf while the capacitive supply voltage component is up and gate 84 is enabled. Depending on the phasing of secondary current (ground fault current) relative to the line voltage, which, in turn, determines the direction of feedback current flow, either a positive or a negative voltage (relative to a reference voltage) will be developed across resistor Rf. This voltage is monitored by detectors 80, 82, and, if it exceeds either a positive or negative voltage threshold level (relative to the reference voltage), the appropriate detector triggers a one-shot pulse generator 86 which issues a discrete pulse 86a disabling gate 84. Amplifier 22 is gated OFF for the duration of pulse 86a to define an interval T2 during which the amplifier presents an open-circuit to secondary winding 22 and feedback current If goes to zero. At the same time, the detector 80 or 82 responsible for triggering pulse generator 86 also issues a predetermined, discrete current pulse (positive pulse 80a or negative pulse 82a, respectively) to an integrator 88, such as an integrating capacitor. With the termination of pulse 86a, gate 84 is again enabled, and amplifier 22 is gated ON for the next secondary current sampling interval TL.

By virtue of the synchronous detection approach utilized, feedback current If will always flow in one direction for secondary current which represents ground fault current, and thus the voltage developed across resistor Rf will be uniformly of one polarity.

Consequently, only one of the detectors 80, 82 is operative in charging integrating capacitor 88. If the secondary current magnitude is indicative of ground fault current of a trip level magnitude, e.g. 5 milliamps, the voltage developed on the integrating capacitor will rise to a level exceeding one of the threshold levels established in dual polarity threshold detector 90, which may be constructed in the manner of Is threshold detector 38 seen in FIG. 3A. The detector 90 then operates to effect the triggering of thyristor SCR, thereby initiating a ground fault trip function.

It is seen that this alternative approach to sensing secondary current in winding 12, provides, in contrast to the periodic sampling rate established by oscillator 34 in FIG. 1, sampling of the secondary current at a variable rate based on its rate-of-change. Thus, the pulses integrated by integrator 88 have a variable repetition rate indicative of ground fault current magnitude and therefore can be considered as a frequency modulated ground fault signal. It will be noted that high frequency noise appearing as transient oscillatory secondary current will, if in excess of the threshold levels established in detectors 80 and 82, typically trigger these detectors equal times, and thus the positive and negative current pulses issued thereby will not result in any net charge on the integrating capacitor. Moreover, the thresholds of these detectors can be established at levels which will be exceeded by linear ramp feedback current due to amplifier offset voltage, at the most, only several times during a half-cycle sampling period. The resulting charge accummulated in the integrating capacitor at the end of the sampling period would thus be well below the threshold level established in detector 90, and no trip function would be initiated. During the half-cycle interval between sampling periods, this charge due to offset voltage would be dissipated through a resistor shunting the integrating capacitor, such as is done in the embodiment of FIG. 1. Also during the intervals between sampling periods, the embodiment of FIG. 5 would be implemented to detect the existence of a low impedance ground on the neutral conductor in the manner disclosed in FIG. 1.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A ground fault circuit interrupting device for interrupting an electrical power circuit including at least one line conductor and a neutral conductor, grounded at the source, in the event of a ground fault on the line conductor, said device including, in combination:
   A. circuit interrupting contacts for connection in series with at least the line conductor of the power circuit;
   B. a differential current transformer having a first primary winding for connection in series with the line conductor, a second primary winding for connection in series with the neutral conductor, and a secondary winding;
   C. an active load connected across said secondary winding;
   D. means operating during a secondary current sampling period to repeatedly switch said active load between extremely low and extremely high impedance states to alternately operate said secondary winding into essentially a short-circuit and an open-circuit, each short-circuiting of said secondary winding creating a sampling interval during which the current flowing in said active load is a function of the current flowing in said secondary winding;
   E. means for developing a signal indicative of the integral of the current flowing in said active load over a plurality of sampling intervals within said sampling period; and
   F. means for initiating opening of said interrupter contacts when said signal exceeds a predetermined threshold.

2. The ground fault circuit interrupting device defined in claim 1, wherein said active load is constituted by a differential amplifier having an inverting input connected directly to one side of said secondary winding, a non-inverting input directly connected to the other side of said secondary winding, and an output connected back to said inverting input as a negative feedback path, said switch means operating to gate said amplifier ON pursuant to short-circuiting said secondary winding and to gate said amplifier OFF pursuant to open-circuiting said secondary winding, and the current flowing in said feedback path while said amplifier is gated ON being a function of the current flowing in said secondary winding.

3. The ground fault circuit interrupting device defined in claim 2, wherein said means for developing a signal proportional to the integral of the current flowing in said active load over a plurality of sampling intervals within a sampling period comprises an integrating capacitor connected in said amplifier feedback path.

4. A ground fault circuit interrupting device defined in claim 2, wherein said means for developing a signal proportional to the integral of the current flowing in said active load over a plurality of sampling intervals within a sampling period includes
   (1) gating means operating to normally gate said amplifier ON during said sampling period,
   (2) a resistor serially connected in said amplifier feedback path,
   (3) detector means operating to momentarily disable said gating means, thereby gating said amplifier OFF, and to issue a predetermined current pulse each time the voltage developed across said resistor exceeds a predetermined threshold, and
   (4) an integrator for integrating said current pulses issuing during a sampling period pursuant to developing said signal for said contact opening initiating means.

5. The ground fault circuit interrupting device defined in claim 4, wherein said detector means comprises a positive voltage threshold detector and a negative voltage threshold detector, said positive voltage threshold detector operating to momentarily disable said gating means and issue a first predetermined current pulse to said integrator each time a relatively positive voltage developed across said feedback resistor exceeds a predetermined position threshold level, and said negative voltage threshold detector operating to momentarily disable said gating means and issue a second current pulse equal to said first current pulse, to said integrator each time a relatively negative voltage developed across said resistor exceeds a predetermined negative threshold level, said integrator integrating said first and second current pulses in opposite directions pursuant to developing said signal for said contact opening initiating means.

6. The ground fault circuit interrupting device defined in claim 2, which further includes means for synchronizing said switch means to the line frequency of the power circuit so as to define a half cycle long secondary current sampling period during each line frequency cycle when the slope of the secondary current waveform is uniformly of one polarity.

7. The ground fault circuit interrupting device defined in claim 6, which further includes neutral ground fault sensing means coordinated by said synchronizing means to conduct a neutral ground fault sampling period during each line frequency cycle after the conclusion of said secondary current sampling period, the neutral ground fault sensing means including
   (1) a capacitor,
   (2) means for connecting said capacitor with said secondary winding at the beginning of each neutral ground fault sampling period to create a resonant circuit,
   (3) a negative impedance network connected with said resonant circuit, said negative impedance network shock exciting said tank circuit at the beginning of each neutral ground fault sampling period to develop a ringing oscillation therein, and
   (4) amplitude sensing means for signaling the existence of a low impedance ground fault on the neutral conductor if the amplitude of said ringing oscillation fails to exceed a predetermined threshold level by the conclusion of said neutral ground fault sampling period.

8. A ground fault circuit interrupting device for interrupting an electrical power circuit, including at least one line conductor and a neutral conductor grounded at the source, in the event of a ground fault on the line conductor, said device including, in combination:
   A. circuit interrupting contacts for connection in series with at least the line conductor of the power circuit;
   B. a differential current transformer having a first primary winding for connection in series with the line conductor, a second primary winding for connection in series with the neutral conductor, and a secondary winding;
   C. a differential amplifier having
      (1) an inverting input connected directly to one side of said secondary winding,
      (2) a non-inverting input connected directly to the other side of said secondary winding, and
      (3) an output connected back to said inverting input as a negative feedback path;
   D. gating means for gating said amplifier ON to essentially short circuit said secondary winding and OFF to essentially open circuit said secondary winding;
   E. an oscillator synchronized to the power circuit line frequency and controlling said gating means to repeatedly and periodically gate said amplifier ON and OFF over a sampling period during which the slope of the current waveform in said secondary winding is uniformly of one polarity, each gating ON of said amplifier providing a secondary current sampling interval during which a current pulse flows in said amplifier feedback path in response to current flow in said secondary winding, each said current pulse being proportional to the change in the current flowing in the short-circuited secondary winding during the associated sampling interval;
   F. a capacitor connected in said amplifier feedback path for integrating said feedback current pulses over each sampling period; and
   G. threshold detector means operating to initiate opening of said interrupter contacts when the voltage appearing across said capacitor during a sampling period exceeds a predetermined threshold level.

9. The ground fault circuit interrupting device defined in claim 8, wherein said oscillator controls said gating means to produce at least ten sampling intervals during each sampling period for a 60 Hertz line frequency.

10. The ground fault circuit interrupting device defined in claim 9, wherein said oscillator controls said gating means to gate said amplifier ON for approximately a 450 microseconds sampling interval and to gate said amplifier OFF for approximately a 50 microseconds interval between each sampling interval.

11. The ground fault circuit interrupting device defined in claim 8, wherein said threshold detector means is a dual polarity voltage threshold detector operating to initiate opening of said interrupter contacts when a relatively positive voltage developed across said capacitor rises above a first threshold voltage level or a relatively negative voltage developed across said capacitor falls below a second voltage threshold level.

12. The ground fault circuit interrupting device defined in claim 11, which further includes a regulated power supply for connection between the line and neutral conductors of the power circuit, said power supply operating to develop a regulated supply voltage across first and second buses, said power supply further operating to gate said amplifier OFF via said gating means and to disable said oscillator and said threshold detector means until the supply voltage across said first and second buses comes up to the regulated level.

13. The ground fault circuit interrupting device defined in claim 12, wherein said power supply is connected between the line and neutral conductors of the power circuit via parallel paths, one path including a capacitor and the other path including a resistor, whereby to develop a regulated supply voltage across said first and second buses having a first half-wave rectified component in phase with the line voltage as derived through said resistor and a second half-wave rectified component, as derived through said capacitor, which leads said first component by one quarter cycle at the line frequency, said second supply voltage component being utilized via said gating means to synchronize said secondary current sampling period to the line frequency.

14. The ground fault circuit interrupting device defined in claim 8, which further includes a neutral ground fault sensing means sychronized to the power circuit line frequency and operating to detect the presence of a low impedance ground fault on the neutral conductor during a neutral ground fault sampling period conducted during each line frequency cycle following said secondary current sampling period.

15. The ground fault circuit interrupting device defined in claim 14, wherein said neutral ground fault sensing means includes (1) a capacitor, (2) means for connecting said capacitor with said secondary winding at the beginning of each neutral ground fault sampling period to create a resonant circuit, (3) a negative impedance network connected with said resonant circuit, said negative impedance network shock exciting said tank circuit at the beginning of each neutral ground fault sampling period to develop a ringing oscillation therein, and (4) amplitude sensing means for signaling the existence of a low impedance ground fault on the neutral conductor if the amplitude of said ringing oscillation fails to exceed a predetermined threshold level by the conclusion of said neutral ground fault sampling period.

16. The ground fault circuit interrupting device defined in claim 15, wherein said amplitude sensing means, in signaling the existence of a low impedance ground fault on the neutral conductor, operates to inject a charge on said integrating capacitor in said amplifier feedback path.

17. The ground fault circuit interrupting device defined in claim 15, which further includes a regulated power supply for connection between the line and neutral conductors of the power circuit, said power supply operating to develop a regulated supply voltage across first and second buses, said power supply further operating to gate said amplifier OFF via said gating means and to disable said oscillator and said threshold detector means until the supply voltage across said first and second buses comes up to the regulated level.

18. The ground fault circuit interrupting device defined in claim 17, wherein said power supply is connected between the line and neutral conductors of the power cirucit via parallel paths, one path including a capacitor and the other path including a resistor, whereby to develop a regulated supply voltage across said first and second buses having a first half-wave rectified component in phase with the line voltage as derived through said resistor and a second half-wave rectified component, as derived through said capacitor, which leads said first component by one quarter cycle of the line frequency, said second supply voltage component, upon coming up to the regulated level, enabling said gating means and said threshold detector means and initiating operation of said oscillator to begin a secondary current sampling period, said neutral ground fault sensing means including means disabling said gating means to terminate operation of said oscillator and gate said amplifier OFF in response to the fall off of said second supply voltage component from the regulated level, thereby to begin a neutral ground fault sampling period.

19. The ground fault circuit interrupting device defined in claim 18, wherein said neutral ground fault sensing means further includes means operating to terminate said neutral ground fault sampling period in response to the fall off of said first supply voltage component from the regulated level.

20. The ground fault circuit interrupting device defined in claim 19, wherein said amplitude sensing means is controlled by said means operating to terminate said neutral ground fault sampling period to inject a charge on said integrating capacitor in said amplifier feedback path pursuant to signaling the existence of a low impedance ground fault on the neutral conductor.

* * * * *